Patented Jan. 30, 1951

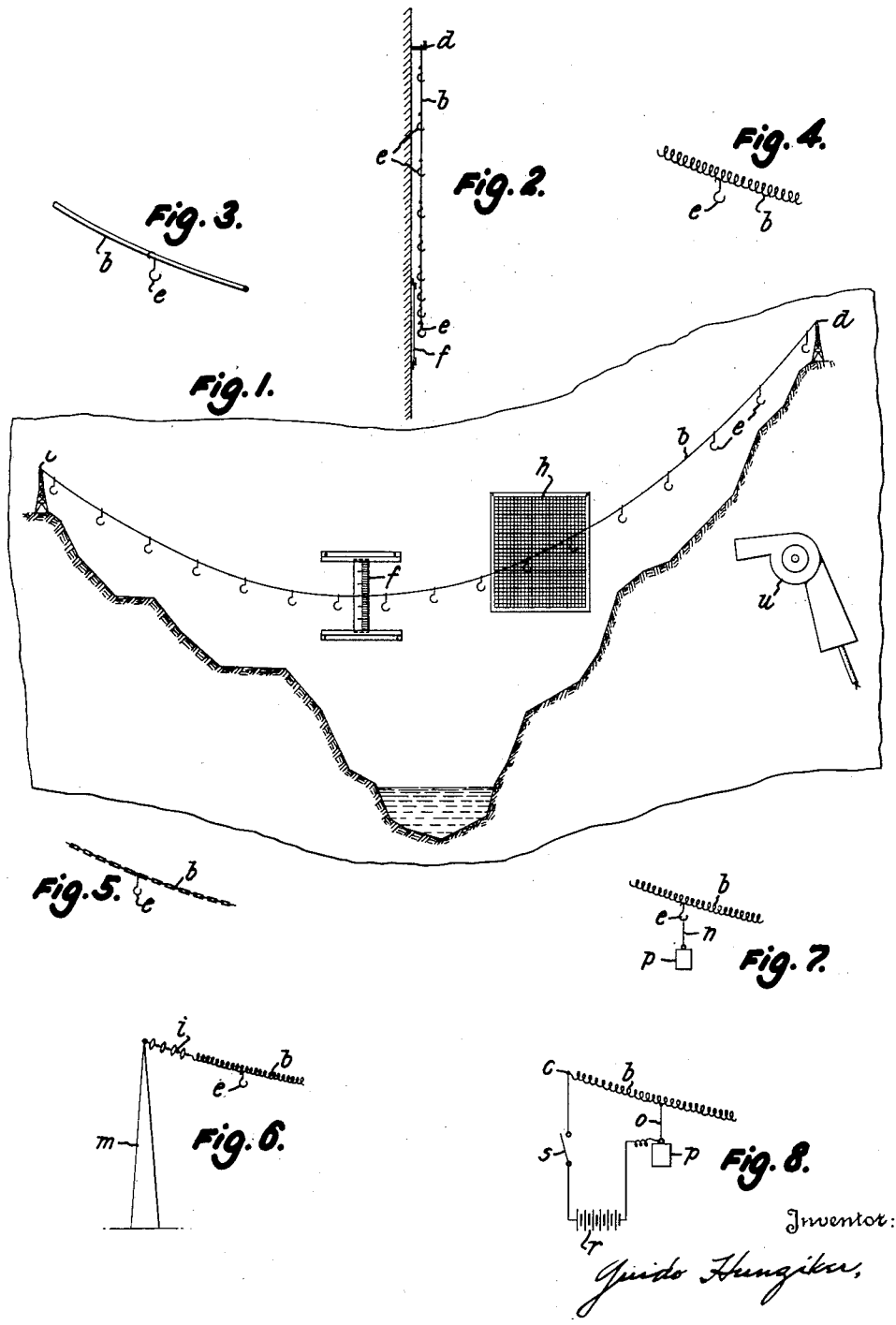

2,539,954

UNITED STATES PATENT OFFICE 2,539,954

APPARATUS FOR DETERMINING THE BEHAVIOR OF SUSPENDED CABLES

Guido Hunziker, Baden, Switzerland

Application August 5, 1947, Serial No. 766,311
In Switzerland July 16, 1941

Section 1, Public Law 690, August 8, 1946
Patent expires July 16, 1961

14 Claims. (Cl. 73—88)

Numerous mechanical phenomena of a static and dynamic kind which occur on suspended or stretched wires, particularly in overhead transmission lines, as a result of the effect of external forces, such as for instance parasitic loads due to snow and ice, wind pressure, impulses from air eddies, etc., cannot be calculated beforehand or if so, only very approximately. These external forces can, however, seriously affect the safety of operation of the line or endanger the surroundings of the transmission plant. Up to the present it has been impossible to predict or determine mathematically the phenomena which may occur on wires and conductors suspended between transmission masts with insulator chains, where the supplementary loads are unevenly distributed or when such unevenly distributed parasitic loads fall away.

A need therefore arises for examining static and dynamic phenomena by means of a device which is a true-angle model of the line in question, and where the same effects are reproduced to scale as actually occur in practice. According to the laws of mechanical similitude it is found that it is impossible to produce geometrical overhead line models which behave statically and dynamically the same way as the actual line, if such models are made of the same or similar material as the line itself. The length scale of the model, i. e. the ratio of the length of the real line to that of the model, is equal to the ratio of the dynamic elasticity values of the conductor materials used. In this case the dynamic elasticity value is defined as the quotient from the modulus of elasticity E of the material and the density (or weight of wire per unit length and unit cross-section). The equation for the length scale of the model is thus:

$$\frac{l}{l_m} = \lambda = \frac{E}{E_m} \cdot \frac{\gamma_m}{\gamma}$$

wherein $l$ is the length, E is the modulus of elasticity, $\gamma$ is the density and the index $m$ indicates that the character identifies a property of the model, whilst the characters without index relate to the transmission line itself. The Greek characters indicate demensional ratios.

If this law is used as a basis, it is found that the dynamic elasticity values of known metals do not differ sufficiently in order that merely by substituting some other metal for the actual line conductor metal, a useful model scale can be obtained. If a scale of length is selected, then according to the laws of mechanical similitude, the scales of force and time for the model are fixed.

It is, however, not necessary to make the wire model to the same length scale as all the other model values; the model also behaves in the same way, both statically and dynamically, as the full-sized line, if any optional scale is selected for the diameter of the wire. If in the model, the wire diameter of the actual line is reduced in the same ratio as the lengths, a model is generally obtained the dimensions of which are quite impracticable. A conductor 400 metres long and having a diameter of 20 mm. would for instance with a scale of 1:400 for the length, and the same scale for the cross-section, result in a diameter of 0.05 mm. for a model 1 m. long, and therefore be much too fragile for practical purposes. For this reason it is expedient to choose a different scale for the diameter.

For the general case, where the ratio $\lambda'$ of the wire diameters is not made equal to that ($\lambda$) of the lengths, the ratio K of the forces K is proportional to the products of the densities $\gamma$, cross-sections $q$ and lengths $l$; that is the products of the densities and volumes:

$$\frac{K}{K_m} = \kappa = \frac{\gamma}{\gamma_m} \cdot \frac{q}{q_m} \cdot \frac{l}{l_m}$$

or $$\kappa = \frac{\gamma}{\gamma_m} \lambda \cdot \lambda'^2$$

or also $$\kappa = \frac{E}{E_m} \lambda'^2$$

Only in the special case where the ratio of the wire diameters is equal to the selected ratio of the lengths ($\lambda' = \lambda$), are the forces proportional to the products of the density and the cube of the lengths:

$$\kappa = \frac{\gamma}{\gamma_m} \cdot \lambda^3$$

The times $t$ are in all cases proportional to the square root of the ratio of the lengths:

$$\frac{t}{t_m} = \tau = \sqrt{\lambda}$$

By means of the invention it is possible to reproduce wires or conductors of any span, even the largest possible ones occurring in practice, to such a scale that the entire true-angle model is clearly arranged and has practical dimensions. This is achieved by representing the actual conductor in the model by a tension member (wire, rope, chain, or the like) of greater elasticity, which is so constructed that the ratio between the elasticity value $$\left(\frac{E}{\gamma}\right)$$

of the conductor and that of the tension member corresponds to the desired length scale of the model.

Rubber threads and cylindrical helical springs are preferably used in the model for the tension member. When two of the values, length scale $\lambda$ of the model, density per unit length $\gamma$, and a modulus of elasticity E, have been selected, it is to be noted that the third value is fixed. Thus for instance if the modulus of elasticity of a certain rubber and the length scale are known, then the necessary density of the rubber thread for the model is also determined. More accurate adjustment is possible by means of a cylindrical helical spring where the imaginary modulus of elasticity and density can easily be calculated from the kind of metal, wire gauge, diameter of coils, and number of coils per unit length. In this case "imaginary modulus of elasticity" of a helical spring is not the modulus of elasticity of the metal of the spring but is the force (in kg.) which causes the length of the spring, referred to the unit of cross-section (in cm.$^2$) of the spring wire, to extend to twice its original value. The "imaginary density" of a helical spring is equal to the weight (in gr.) per unit length (in cm.) of unstretched spring and per unit cross-section (in cm.$^2$) of the spring wire. With this kind of model it is particularly favourable that the spring constants can easily be altered and the same spring wire can be wound into springs of different diameter having various numbers of coils.

With a model produced according to the invention the dynamic and static effects occur mechanically in an analogous manner as in the case of the actual conductor, that is they have to be multiplied with the appropriate length, time and force scales, so that the true lengths, times and forces are obtained. Nevertheless, the possibility of reproduction is restricted to such processes as are mainly due to gravity, inertia and elastic forces.

Since the various effects encountered on transmission lines are often of importance for the territory within the range of the cables, wires, and supporting elements, it is particularly interesting if the model is supplemented by a geometrical reproduction of the ground-line profile in question. The territory within the range of the line or parts of same can be shown in the model in the form of a relief to a reduced scale of length or simply as a longitudinal profile which may be augmented by transverse profiles, so that the effects of the mechanical processes as regards the ground over which the line passes, can be examined.

An object of the invention is to provide a small scale model in which a suspended wire or cable is represented by a tension element, and in which the physical properties of the tension element are so related to those of the actual wire or cable, and to the reduction in length scale of the model that the performance of the actual wire under static or dynamic loadings may be determined from measurements of the deflections of the tension element under preselected scale loadings simulating those which may be imposed upon the actual wire or cable. An object is to provide a model in which a tension element simulates a wire or cable on a preselected length ratio but on a different diameter ratio, and in which the modulus of elasticity of the tension element is equal to the product of the modulus of elasticity of the actual wire or cable multiplied by the length ratio and the ratio of the density of the tension element to the density of the wire or cable. Other objects are to provide small scale models of the character stated in which the tension element is supported adjacent a wall provided with scale graduations for the conventional measurement of deflections and with a scale representation of the terrain beneath the wire or cable and its supports. Other objects are to provide small scale models in which an actual wire or cable is simulated by a helical spring, a rubber cord or a flexible chain of greater elasticity than the wire or cable. Another and specific object is to provide a small scale model in which a tension element simulating a suspended wire or cable is provided with a series of hooks to receive weights for simulating a load distributed along the wire or cable.

These and other objects of the invention will be apparent from the following specification when taken with the accompanying drawing in which Fig. 1 is a front view and Fig. 2 a cross-section; Figs. 3 to 5 represent a detail of three forms of the line image, Figs. 6 to 8 show some other details of the model, where an overhead line passes over a valley with a lake. The ground profile $a$ is drawn to scale on a flat vertical wall $g$. The line image $b$ consists of a rubber cord as shown in a larger scale in Fig. 3, of a thin steel helical spring as shown in Fig. 4, or of an elastic chain, as shown in Fig. 5. As evident from Figs. 1 and 2 this image is suspended from two nails of hooks $c$, $d$, practically close to the wall, and represents the span of the line. The wall can be covered with millimetre graph paper, as marked at $h$.

In addition to the line conductor, all the other movable and fixed components of the line can be reproduced mechanically, so that the influence of the insulator strings (end strain and suspension insulators), masts and their elastic deformations, movable cross-arms or their movable masts, as well as movable single loads, on the process under investigation can be examined. By means of suitable devices the influence of the neighbouring spans on the section under investigation can also be examined, and this is of special interest when the latter is supported between movable masts or masts having movable supporting elements, or if the line can slide on the supporting elements. The behaviour of entire spans with intermediate supporting or suspension elements can also be reproduced. Line sections with several parallel conductors, as well as combinations of conductors, for instance catenary suspensions, can also be reproduced.

The static and dynamic effects which are encountered in practice can be reproduced in the model and measured, by applying supplementary loads to the model in the form of weights fixed at intervals along the model line. Rigid or movable individual loads on the actual line are represented by corresponding individual weights true to scale. The model line $b$ is provided with hooks $e$ for hanging on supplementary loads. The hooks $e$ may be hung loosely or clamped or fixed in another suitable kind at the line image, as to be seen from Figs. 3 to 5.

The falling away of supplementary loads from the model is achieved by hanging these loads $p$ on the model line $b$ by means of disconnectable holding devices, for instance, as shown in Fig. 7, a thin thread $n$, which can be burnt away for the purpose of releasing the weight $p$. Either all the supplementary loads along the entire span can be made to fall off at the same time, or if desired, only part of the weights over any section of the line, the weights being released for instance by electrical means, as represented in Fig. 8, in which $o$ is a thin metal wire, $r$ a current source and $s$ a switch; when the switch $s$ is closed, the thin wire $o$ will be fused away so that the weight $p$ falls down. Suitable arrangements can also be made to enable the weights to fall off one after the other.

By providing sliding measuring scales in a reference plane, the position of all parts of a line, particularly the sag at any point, can be measured. In order to avoid errors of parallax, mirrors $f$ can be arranged in the plane of reference, these mirrors being provided with a scale on which the position of the line elements can be ascertained. The mirrors can be moved along the wall as required.

Aerodynamic phenomena, such as wind pressure, air resistance effect, impulses due to air eddies and the oscillations produced by same, damping effects and conductor oscillations, can be produced in the model by blowing on it, with a blower $u$, as indicated by dotted lines in Fig. 1, once the corresponding air resistance coefficient of the model conductor has been determined.

By the method described, it is not only possible to reproduce static and dynamic phenomena occurring on overhead electric transmission lines, but also on trolley wires, antennae, anchor cables, terminal devices, ropeways, and the like, in so far as the phenomena in question are mainly due to gravity, air or water movements, elastic and mass forces.

I claim:

1. Device for determining the static and dynamic behaviour of a system which possesses at least one wire under tension, said device comprising a supporting structure, a tension element representing said wire, means mounting said tension element on said supporting structure to constitute a small-scale true-angle model in accordance with the laws of mechanical similitude, and means for imposing at predetermined points along said tension element preselected scale loadings simulating loadings which may be imposed upon said wire; the length of said tension element and the relative location of said mounting means being in a preselected ratio $l/\lambda$ to the length of said wire and the spacing of the ends thereof, and said tension element having a modulus of elasticity equal to the modulus of elasticity of said wire multiplied by the product of said length ratio $l/\lambda$ and the ratio of the density of said tension element to the density of said wire.

2. Device as claimed in claim 1, characterized by the feature that the tension element in the model has a greater elasticity than the actual wire which it represents.

3. Device as in claim 2, characterized by the feature that said tension element comprises a cylindrical helical spring whose imaginary modulus of elasticity is smaller than that of said wire of the actual system.

4. Device as in claim 1, characterized by the feature that said tension element in the model is formed by a single spring.

5. Device as in claim 1, characterized by the feature that said tension element representing the wire of the actual system is a rubber cord.

6. Device as in claim 1, characterized by the feature that said tension element representing the wire of the actual system is a flexible chain.

7. Device as in claim 1, including a blower for directing upon said tension element air currents simulating air pressure on said wire.

8. Device as in claim 1, characterized by the feature that the load imposing means includes weights arranged on the tension element of the model in a movable manner.

9. Device as in claim 8, characterized by the feature that means are provided for releasing said weights.

10. Device as in claim 1, characterized by the feature that the tension element is arranged over a representation of the ground beneath said wire reproduced to the same scale as the length scale of the tension element.

11. Device as in claim 10, characterized by the feature that the ground representation is three-dimensional.

12. Device as in claim 1, characterized by the feature that said supporting structure is a wall, and a scale of the ground beneath said wire is reproduced on said wall.

13. Device as in claim 12, characterized by the feature that a portion of said wall behind the tension element is covered with graph paper.

14. Device as in claim 12, characterized by the feature that at least one movable reading mirror is located on the wall behind the tension element.

GUIDO HUNZIKER.

REFERENCES CITED

The following references are of record in the file of this patent:

UNITED STATES PATENTS

| Number | Name | Date |
| --- | --- | --- |
| 1,551,282 | Beggs | Aug. 25, 1925 |
| 1,598,141 | Lahouse | Aug. 31, 1926 |
| 1,754,049 | Rieckhof | Apr. 8, 1930 |
| 2,043,910 | Ibanez Valenzuela | June 9, 1936 |
| 2,205,102 | Loudenslager et al. | June 18, 1940 |
| 2,207,270 | Semar | July 9, 1940 |

FOREIGN PATENTS

| Number | Country | Date |
| --- | --- | --- |
| 877,720 | France | Sept. 14, 1942 |
| 4,602 | Great Britain | 1907 |
| 448,300 | Great Britain | June 5, 1936 |
| 512,146 | Great Britain | Aug. 30, 1939 |

OTHER REFERENCES

Karpov et al.: Article entitled "Building and testing an arch dam model," Civil Engineering for Jan. 1932, pp. 11 to 16. Photostat copy in Class 73–432.